United States Patent [19]
Heckman

[11] Patent Number: 5,183,173
[45] Date of Patent: Feb. 2, 1993

[54] AUTO VENTING FUEL CAP

[75] Inventor: Greg A. Heckman, Dixon, Ill.

[73] Assignee: Epicor Industries, Inc., Deefield, Ill.

[21] Appl. No.: 737,220

[22] Filed: Jul. 29, 1991

[51] Int. Cl.⁵ .................................................. B65D 51/00
[52] U.S. Cl. .................................. 220/367; 220/303; 220/DIG. 33
[58] Field of Search .............. 220/367, 303, DIG. 32, 220/DIG. 33, 203

[56] References Cited

U.S. PATENT DOCUMENTS

| | | | |
|---|---|---|---|
| Re. 27,307 | 3/1972 | Durso et al. | 215/9 |
| 1,453,299 | 5/1923 | Wetzel | 220/303 |
| 1,847,117 | 3/1932 | Lantero | 220/210 X |
| 1,985,787 | 12/1934 | Le Bourveau | 220/210 X |
| 2,010,200 | 8/1935 | Rufener | 220/57 |
| 2,437,674 | 3/1948 | Armbruster | 70/173 |
| 2,679,946 | 6/1954 | Friend | 220/40 |
| 2,793,777 | 5/1957 | Lewis | 215/9 |
| 2,867,342 | 1/1959 | Baars et al. | 215/9 |
| 3,682,343 | 8/1972 | Landen | 215/9 |
| 3,703,245 | 11/1972 | Brewer | 220/40 R |
| 3,735,887 | 5/1973 | Morris | 215/9 |
| 3,856,316 | 12/1974 | Badberg | 280/5 A |
| 3,907,155 | 9/1975 | Smith et al. | 220/210 |
| 3,937,357 | 2/1976 | Burgess | 220/203 |
| 3,938,692 | 2/1976 | Crute | 220/203 |
| 3,998,078 | 12/1976 | Detwiler | 70/171 |
| 4,000,633 | 1/1977 | Evans | 220/303 X |
| 4,013,191 | 3/1977 | Gerdes | 220/203 |
| 4,036,399 | 7/1977 | Gerdes | 220/303 |
| 4,049,152 | 9/1977 | Treanor | 220/367 X |
| 4,053,083 | 10/1977 | Hukuta | 220/303 X |
| 4,142,756 | 3/1979 | Henning et al. | 296/1 C |
| 4,162,021 | 7/1979 | Crute | 220/202 |
| 4,177,931 | 12/1979 | Evans | 220/228 |
| 4,223,794 | 9/1980 | Morris | 215/220 |
| 4,231,498 | 11/1980 | Malone | 220/304 |
| 4,267,858 | 5/1981 | Lewis | 137/529 |
| 4,271,976 | 6/1981 | Detwiler | 220/DIG. 32 X |
| 4,280,347 | 7/1981 | Evans | 70/165 |
| 4,299,102 | 11/1981 | Aro | 70/165 |
| 4,358,023 | 11/1982 | Fukuta | 220/209 |
| 4,436,219 | 3/1984 | Reutter | 220/295 |
| 4,453,388 | 6/1984 | Baker et al. | 70/165 |
| 4,458,824 | 7/1984 | Baker et al. | 220/203 |
| 4,465,202 | 8/1984 | Stoves et al. | 220/203 |
| 4,466,550 | 8/1984 | Sullivan | 220/206 |
| 4,527,406 | 7/1985 | Baker | 70/165 |
| 4,529,099 | 7/1985 | Zerrer | 220/315 |
| 4,588,102 | 5/1986 | Kasugai | 220/DIG. 32 X |
| 4,676,390 | 6/1987 | Harris | 220/203 |
| 4,712,586 | 12/1987 | McCauley et al. | 138/89 |
| 4,712,703 | 12/1987 | Oddenino | 220/210 |
| 4,726,488 | 2/1988 | Kasugai | 220/303 X |
| 4,736,863 | 4/1988 | Harris | 220/203 |
| 4,779,755 | 10/1988 | Harris | 220/203 |
| 4,785,961 | 11/1988 | Kasugai et al. | 220/203 |
| 4,787,529 | 11/1988 | Harris | 220/DIG. 33 X |
| 4,795,050 | 1/1989 | Smith et al. | 220/85 V R |
| 4,830,058 | 5/1989 | Harris | 138/89 |
| 4,887,733 | 12/1989 | Harris | 220/203 |
| 5,108,001 | 4/1992 | Harris | 220/203 |

FOREIGN PATENT DOCUMENTS

| 2014130 | 12/1971 | Fed. Rep. of Germany . |
| 2657747 | 6/1978 | Fed. Rep. of Germany . |
| 947882 | 7/1949 | France . |
| 1190429 | 10/1959 | France . |
| 1262388 | 9/1961 | France . |

*Primary Examiner*—Steven M. Pollard
*Attorney, Agent, or Firm*—Allegretti & Witcoff, Ltd.

[57] ABSTRACT

A fuel cap for closing a threaded filler neck of a fuel tank is disclosed. The can has a central button or driver which reciprocates within an opening in the crown of the cap. When the cap is installed on a filler neck, the driver is in an upper position and the crown freely rotates relative to the threaded housing in a cap-removal direction. When the driver is depressed, a pressure relief valve is opened and a driving relationship is created between the crown and the threaded housing in a cap-removal direction, permitting the cap to be removed from the filler neck. When the crown is rotated in a cap-installation direction, the driver is moved to the upper position and the pressure relief valve is closed.

18 Claims, 3 Drawing Sheets

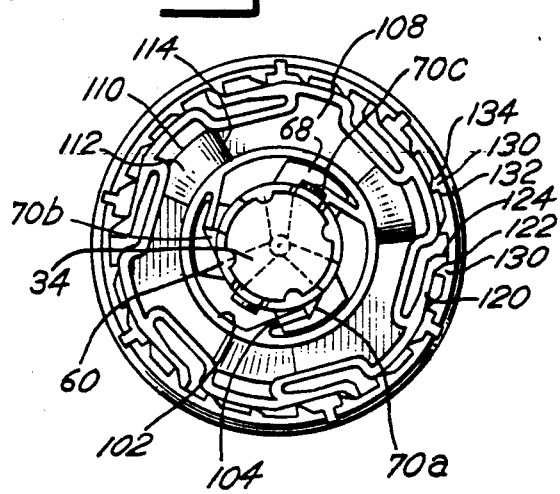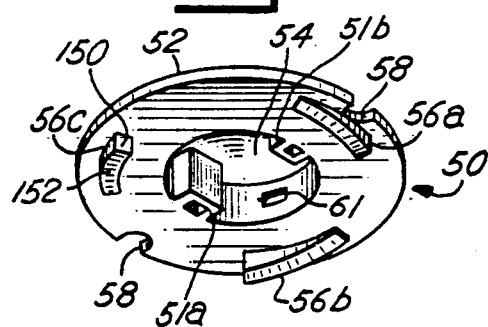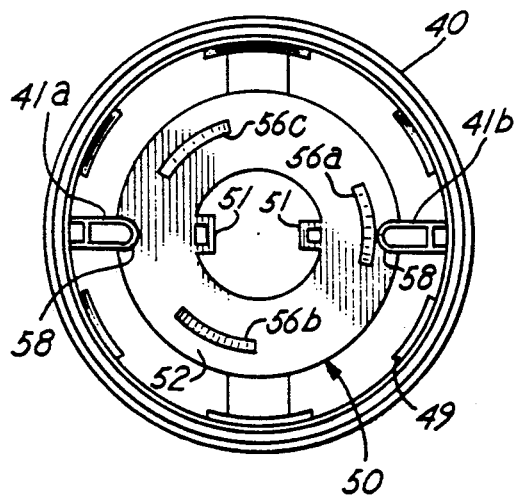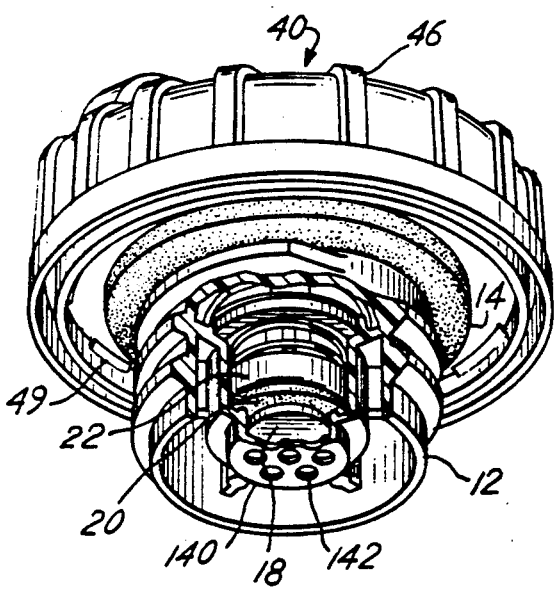

AUTO VENTING FUEL CAP

BACKGROUND OF THE INVENTION

A. Field of the Invention

This invention relates to fuel caps for sealing the filler neck of fuel tanks of the type commonly found on automobiles, trucks and the like. More particularly, the invention relates to a fuel cap having a venting feature whereby the operator necessarily vents excessive pressure from the fuel tank before removing the cap from the filler neck, and also having a safety feature whereby once the cap is installed on the filler neck, rotational forces applied to the cap in either the cap installation direction or cap removal direction will not break the seal formed between the cap and the filler neck. The release of excessive pressure may be considered "selective" in the sense that the release occurs, as a preliminary step, when the operator elects to remove the cap.

B. Background Art

The fuel cap is a familiar item to anyone who operates gasoline powered motor vehicles. Nevertheless, the fuel cap is an important safety device for the vehicle. A cap must effectively seal the fuel tank so that harmful vapors do not escape into the environment. The cap must also be crashworthy and survive excessive rotational and translational forces as may be incurred in an accident. A cap should also not be subject to unintentional removal from the filler neck as may occur during a collision when rotational forces are applied to the cap in a cap-removal direction. Ideally, the cap should also provide for the selective release of excess pressure from the fuel tank prior to releasing the cap from the filler neck to prevent "geysering", the spillage of hot, flammable, fuel out of the filler neck due to pressure build-up in the tank when the cap is removed.

Considerable effort has been made in the art to produce a cap that achieves one or more of the previously stated objectives, but with varying degrees of success. The Evans patent, U.S. Pat. No. 4,177,931, discloses a "breakaway" fuel cap whereby the crown breaks away from the inner closure member upon the receipt of excessive forces in a collision. This patent, however, does not provide for selective release of pressure from the fuel tank, nor does it provide for selective driving engagement between the crown and the inner closure member in a cap-removal direction once the cap is installed on the filler neck. Another example of a breakaway type patent is U.S. Pat. No. 4,142,756 issued to Henning, et al. Other patents are directed to providing a breakaway feature to the cap whereby if the cap is subject to excessive translational forces, the crown breaks away from the housing, leaving the housing intact on the filler neck preventing the escape of fuel. These patents, however, generally do not provide for the selective release of pressure from the fuel tank or for selective driving engagement between the crown and the inner closure member.

The Harris patent, U.S. Pat. No. 4,830,058, discloses a fuel cap with a manually actuable clutch for selectively providing a driving connection between the outer shell and the closure portion or housing. The Harris patent, however, does not provide for a pressure relief valve for selectively relieving pressure from the fuel tank.

U.S. Pat. No. 4,736,863, also issued to Harris, discloses a ball-type pressure relief valve whereby the ball can be displaced from a sealed position to an open position by manually depressing a plunger. However, this cap does not provide the selective driving engagement features of the present invention whereby the threaded housing is selectively rotatably coupled to the crown.

Thus, it is clear that, heretofore, a fuel cap having all of the features of the present cap has eluded those in the art. The present invention supersedes the prior art fuel caps and provides in a novel fuel cap design the above-mentioned desired properties of a fuel cap, i.e., selective release of pressure from the fuel tank and selective driving engagement between the crown and the inner closure member or housing.

SUMMARY OF THE INVENTION

The present invention is a fuel cap for closing a threaded filler neck of a fuel tank. The cap includes a threaded housing rotatably engaging the filler neck. The threaded housing carries a pressure relief valve through which pressure is selectively vented from the fuel tank. A manually rotatable crown having an aperture covers the threaded housing. The cap further includes an interconnecting means for selectively establishing a driving relationship between the threaded housing and the crown and for opening the relief valve. The interconnecting means is manually operable through the aperture in the crown to open the pressure relief valve and simultaneously establish a driving relationship between the threaded housing and the crown in a cap-removal direction.

In the preferred embodiment of the invention, the interconnecting means includes a driver or button, a valve actuator and a ratchet ring. The driver or button reciprocates axially within the aperture of the crown between upper and lower positions, the driver being connected to the actuator which reciprocates with the driver between first and second positions. The actuator opens the pressure relief valve when the driver is manually depressed to the lower position. The ratchet ring is operatively connected to the driver and actuator for establishing a driving connection between the housing and the crown. When the driver is in the upper position, the pressure relief valve is closed and the crown is freely rotatable relative to the housing in a cap-removal direction and the ratchet ring rotatably establishes a driving connection between the housing and the crown in a cap-installation direction. When the driver is manually depressed to the lower position, the actuator is moved to the second position to open the pressure relief valve and the ratchet ring rotatably establishes a driving connection between the housing and the crown in a cap-removal direction. Thus, the cap can only be removed from the filler neck when the driver has been depressed to the lower position, enhancing the safety of the cap.

It is thus an object of the invention to provide a fuel cap which provides not only a selective venting feature for relieving pressure from a fuel tank, but which also provides for selective rotational coupling of the crown and the threaded housing, preventing unintentional disengagement of the fuel cap from a filler neck.

An additional object of the invention is to provide an auto venting fuel cap which is crashworthy, and thus will survive the application of excessive rotational and translational forces.

An additional object of the present invention is to provide a fuel cap which can be made comparatively easily, at low cost, and which is suitable for mass production.

BRIEF DESCRIPTION OF THE DRAWING

These and other objects, advantages and features of the present invention can be more clearly understood by reference to the accompanying figures in which:

FIG. 2 is an oblique view of the driver of FIG. 1 seen from below showing the circumferentially spaced ramps projecting from the underneath side of the shelf region of the driver;

FIG. 3 is a view of the inside of the crown and the driver of FIG. 1 as seen from below showing the projections on the crown which rotatably couple the crown to the driver; and FIG. 4 is a top view of the cap of FIG. 1 with the crown and driver removed showing the driving relationship between the value actuator and the ratchet ring;

FIG. 7 is an oblique view of the assembled cap partially broken away showing the pressure relief valve carried by the threaded housing.

DETAILED DESCRIPTION OF THE PREFERRED EMBODIMENT

Figure 1:
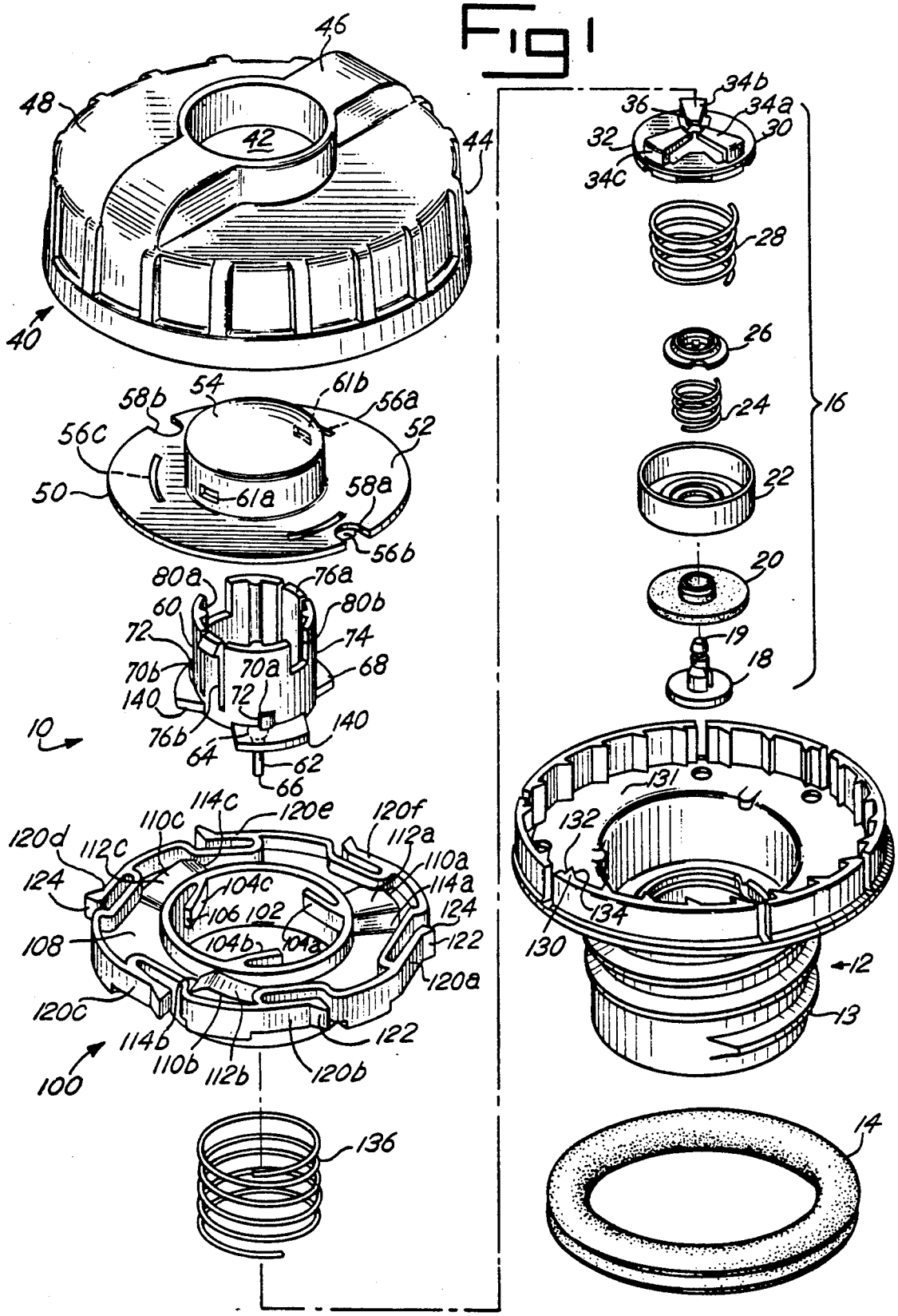
FIG. 1 is an exploded view of the cap according to a preferred embodiment the present invention.

The preferred embodiment of the present invention is shown in exploded view in FIG. 1. The cap 10 includes a threaded housing 12 having threads 13 which rotatably engage the filler neck (not shown) of a fuel tank. A rubber seal 14 fits over the outside of the threaded region of the threaded housing 12 to form a seal between the threaded housing and the filler neck when the cap 10 is installed on the filler neck.

Figure 5:
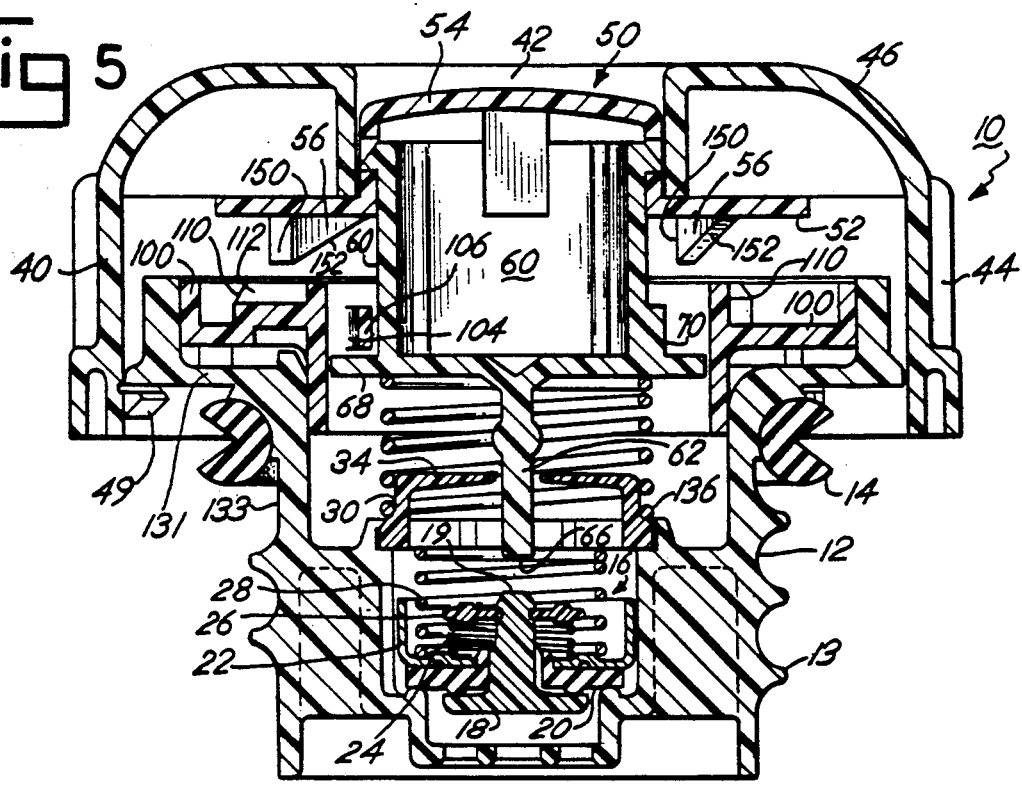
FIG. 5 is a side elevational view of the cap of FIG. 1 in an assembled condition with the driver in the upper position, and with the value actuator in the first position.
Figure 6:
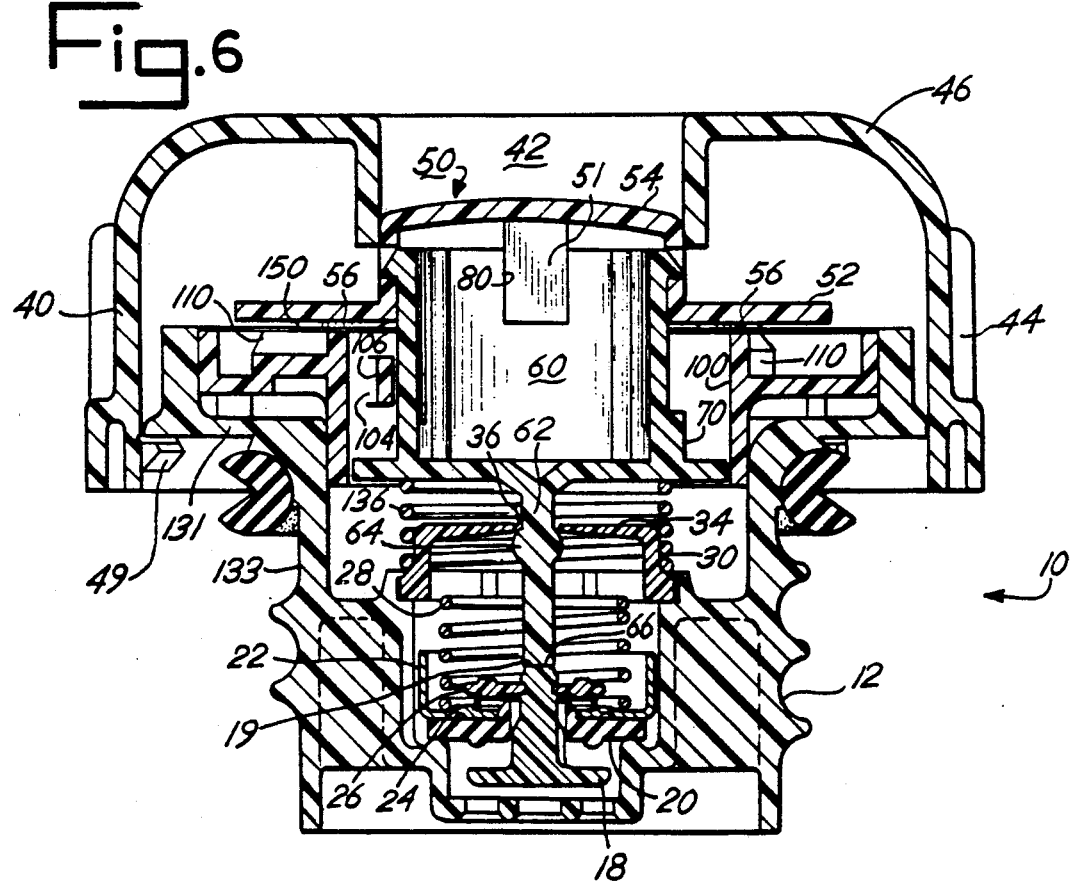
FIG. 6 is a cross-sectional view of the cap of FIG. 1 in an assembled condition with the driver depressed to the lower position, showing the value actuator in the second position opening the pressure relief valve.

Threaded housing 12 carries a pressure release valve assembly 16 at the base of the threaded housing 12. The pressure release valve assembly 16 comprises a valve member 18 having a tip 19, a rubber valve seal 20, a valve cup 22, a biasing spring 24 biasing the valve member 18 to a closed position, a retainer ring 26, a pressure spring 28, and a valve actuator retainer 30. The actuator retainer 30 has a rim 32, three wings 34a–c, and a central aperture 36 formed by the wings 34a–c. The components of the pressure release valve assembly 16 fit together in an assembly in the bottom of the threaded housing 12 as shown in FIGS. 5 and 6.

The cap 10 also includes a crown 40 which covers the threaded housing 12. The crown has a central aperture 42. The crown 40 has a plurality of raised ribs 44 on the outside peripheral surface thereof to provide a hand grip. A raised ridge 46 on the upper surface 48 of the crown 40 facilitates turning the crown 40 in a cap-removal or cap-installation direction.

Within the cap 10 and underneath the crown 40 is a driver or button 50 rotatably coupled to the crown 40. Driver 50 is shown also in FIG. 2, which is an oblique view of the driver 50 seen from below. Referring to FIG. 1 and FIG. 2, the up-raised portion 54 protrudes into the aperture 42 of the crown 40, and reciprocates therein between upper and lower positions. The radially outwardly extending shelf region 52 of the driver 50 has circumferentially spaced downwardly projecting ramps 56a–c. The ramps 56a–c make a driving connection with ramps 110a–c of the ratchet ring 100 when the driver 50 is in the lower position and the crown 40 is rotated in a cap-removal or counter-clockwise direction. The shelf 52 also has recesses 58a–b which cooperate with projections 41a–b on the inside of the crown 42 to rotatably couple the crown 40 to the driver 50, as shown in FIG. 3. FIG. 3 is a view of the inside of the crown 40 as seen from below with the driver 50 installed. Tabs 49 projecting inwardly from the periphery of the crown 40 retain the threaded housing 12 by limiting the downward movement of the threaded housing 12 relative to the crown 40.

Referring to FIG. 1, below the driver 50 is a valve actuator 60. The valve actuator 60 attaches to the driver 50 by means of cantilevered beams 76a–b which snap fit into the apertures 61a–b of the driver 50. The valve actuator thus reciprocates with the driver between first (or upper) and second (or lower) positions. The upper region of the actuator housing 74 has a pair of slots 80a–b which make a precise fit with projections 51a–b (see FIG. 2) on the inside of the up-raised portion 54 of the driver 50. The slots 80 in conjunction with the projections 51 allow the driver 50 and valve actuator 60 to be rotatably coupled together allowing for rotational forces which are applied to the crown 40 and transmitted to the driver 50 to be transmitted to the valve actuator 60.

The valve actuator 60 has a stem 62 downwardly projecting from the actuator housing 74. Stem 62 has an enlarged portioned 64 and a tip 66. The enlarged portion 64 rests above the opening 36 in the actuator retainer 30 when the driver 50 and valve actuator 60 are in the upper position. When driver 50 and valve actuator 60 are pushed to the lower position, enlarged portion 66 passes through the opening 36 and is retained below the opening 36 by the wings 34, thus holding the valve actuator 60 and driver 50 in the lower position. When the driver 50 is pushed to the lower position, thereby moving the valve actuator 60 to the second position, the tip 66 makes contact with the tip 19 of the valve member 18 to push open the valve member 18. Three circumferentially spaced shelves 68 project radially outward from the actuator housing 74. Centered above the shelves 68 are three circumferentially spaced ramps 70a–c having a camming surface 72.

The ratchet ring 100 is operatively connected to the driver 50 and the valve actuator 60 in order to establish a driving connection between the threaded housing 12 and the crown 40. The ratchet ring 100 rests on the shelf region 131 of the threaded housing 12. The valve actuator 60 reciprocates within the central aperture 102 of the ratchet ring 100. Referring to FIGS. 1 and 4, which is a top view of the cap of FIG. 1 with the crown 40 and driver 50 removed, projecting within the aperture 102 are three first ratchet arms 104a–c which have a camming surface 106. The camming surface 106 makes camming engagement with the camming surface 72 of the circumferentially spaced ramps 70 of the valve actuator 60 when the valve actuator 60 is in a first or upper position. Thus, when the valve actuator 60 is in the first or upper position and is rotated in a cap-installation direction, the camming surface 72 of the ramps 70a–c transmits the rotational forces to the first ratchet arms 104a–c. These rotational forces are then transmitted by the second ratchet arms 120a–f to the threaded housing 12, enabling the cap 10 to be installed on a filler neck.

The ratchet ring 100 has a central portion 108 which has projecting upwardly therefrom three ramps 110a–c having sliding surfaces 112a–c and camming surfaces 114a–c. The downwardly projecting ramps 56 of the driver 50 make camming engagement with the camming surfaces 114 when the driver 50 is depressed to the lower position, thereby allowing rotational forces applied to the driver 50 in the cap-removal direction to be translated to the ratchet ring 100. These rotational forces are transmitted by the second ratchet arms 120a–f to the threaded housing 12, enabling the cap 10 to be removed from the filler neck. When the valve actuator 60 is the second or lower position, the ramps 70a–c are held below the first ratchet arms 104.

Referring to FIG. 1 and FIG. 4, the second ratchet arms 120 of the ratchet ring 100 have a sliding surface 122 and a camming surface 124. The camming surface 124 makes a camming engagement with the camming surface 132 of the ramps 130 on the inside of the threaded housing 12. When rotational forces in the cap-removal direction are applied the ratchet ring 100, the camming surfaces 124 drive the threaded housing 12 in the cap-removal direction. When rotational forces in the cap-installation direction are applied to the ratchet ring 100, the sliding surfaces 122 of the second ratchet arms 120 make engagement with the sliding surfaces 134 of the threaded housing, but the frictional forces of the sliding surfaces and the stiffness of the second ratchet arms 120 permit sufficient rotational force to be applied to the threaded housing to allow the threaded housing 12 to be installed on a filler neck. If excessive rotational forces in a cap-installation direction are supplied, the sliding surfaces 122 and the second ratchet arms 120 slide over the ramps 130, preventing a catastrophic failure of the cap.

Referring to FIG. 1 and FIG. 2, when the driver 50 is pushed to the lower position, the ramps 56 on the driver are just above the central portion 108 of the ratchet ring and when the crown 40 and driver 50 are rotated in the cap-removal direction, the camming surface 150 (FIG. 2) of the ramps 56a–c makes camming engagement with the camming surfaces 114a–c (FIG. 1) of the ramps 110 of the ratchet ring 100. When the driver 50 is in the lower position but the crown 40 is rotated in a cap-installation direction, the sliding surfaces 152 (FIG. 2) of the ramps 56a–c slide up the sliding surfaces 112a–c of the ramps 110 on the ratchet ring 100, thus elevating the driver 50 from the lower position to the upper position. Similarly, since the valve actuator 60 is attached to the valve actuator 60, the driver 50 also is moved from the second (or lower) position to the first (or upper) position upon rotation of the crown 40 in the cap-installation direction, placing the ramps 70 on the actuator housing 74 at the same elevation as the first ratchet arms 104 of the ratchet ring 100.

Referring to FIG. 1, the cap 10 further includes a biasing spring 136 which rests on the rim 32 of the actuator retainer 30. Biasing spring 136 biases upward the bottom surface 140 of the shelves 68 on the actuator 60. The biasing spring 136 assists the driver 50 and actuator 60 in moving from the lower position to the upper position when the crown is rotated in a cap-installation direction.

FIG. 5 is a side elevational view of the cap of FIG. 1 in an assembled condition, with the driver 50 in the upper position as would be the case when the cap 10 is installed on a filler neck. Note that in this position, the tip 66 of the valve actuator stem 62 is above the tip 19 of the valve member 18, and thus the valve member 18 is closed due to the biasing of the biasing spring 24. The ramps 70 of the valve actuator 60 are at the same elevation as the camming surface 106 of the first ratchet arms 104 of the ratchet ring 100. Thus, when rotational forces are applied to the crown 40 in a cap-installation direction, the ramps 70 of the valve actuator 60 make a camming engagement with the camming surface 106 of the first ratchet arms 104, thereby allowing the cap 10 to be installed on a filler neck. Note also that when the driver 50 is in the upper position as shown in FIG. 5, the ramps 56 underneath the shelf region 52 of the driver 50 are above the ramps 110 of the ratchet ring 100. Thus, when rotational forces are applied to the crown 40 in a cap-removal direction, ramps 56 will not make driving engagement with the ramps 110 of the ratchet ring 100, thereby preventing unintentional removal of the cap 10 from the filler neck. Also, when the crown 40 is rotated in the cap-removal direction, the ramps 70 on the valve actuator 60 slip over the first ratchet arms 104 without applying appreciable rotational forces to the ratchet ring 100 in a cap-removal direction.

After the cap 10 is installed on a filler neck, and the operator wishes to vent pressure from the tank and then remove the cap, the operator pushes the driver 50 to the lower position. When the driver 50 is pushed to the lower position, as shown in FIG. 6, the ramps 70 of the valve actuator 60 are held below the first ratchet arms 104 of the ratchet ring 100. Note also that the enlarged portion 64 of the stem 62 on the actuator 60 is pushed through the aperture 36 and held in position by the wings 34 of the actuator retainer 30. Thus, the valve actuator 60 and driver 50 are held in this lower position. When the driver 50 and valve actuator 60 are in the lower position, the tip 66 of the stem 62 makes contact with the tip 19 of the valve member 18, pushing open the valve member 18 to vent the tank. When the driver 50 is in the lower position, the ramps 56 on the driver 50 are pushed to the same elevation as the ramps 110 on the ratchet ring 100. When the crown 40 is rotated in the cap-removal direction, the camming surface 150 on the ramp 56 makes camming engagement with the camming surface 114 (not shown in FIG. 6) of the ramps 110, allowing the cap 10 to be removed from the filler neck.

As shown in FIGS. 5 and 6, the shelf region 131 of the threaded housing 12 is of reduced thickness relative to the threaded region 133 of the threaded housing 12. The purpose of this reduced thickness is to provide a breakaway feature to the fuel cap 10. In the event of a collision or an application of excessive of translational forces to the cap 10, the thinner (and thus weaker) region of the shelf region 131 will fracture before the threaded region 133 of the threaded housing 12. Fuel will not escape from the fuel cap 10 in the event of a breakaway of the crown 40 and shelf region 131 from the threaded housing 12 since the valve seal 20 and valve member 18 will remain undisturbed and the rubber seal 14 will remain intact to form a seal between the threaded housing 12 and the filler neck.

FIG. 7 is an oblique view of the assembled cap partially broken away and viewed from below. The central downwardly depending portion of the threaded housing 140 has a plurality of apertures 142 through which pressure escapes from the filler neck and fuel tank when the valve member 18 is opened. Within the downwardly depending portion 140 are the components of the valve assembly 16, including valve member 18, valve seal 20, and valve cup 22.

The fuel cap of the present invention is highly susceptible to mass production, in that the principal components of the design, the threaded housing 12, the crown 40, the ratchet ring 100, the valve actuator 60, the driver 50 and the actuator retainer 30, can be made out of injection molded plastics. Thus, the cap according to the present invention can be manufactured in large quantities at relatively low cost.

As will apparent to those of ordinary skill in the art, alternative choices may be made as to the design of the driver, valve actuator and ratchet ring to selectively establish a driving relationship between the threaded housing and the crown. The scope of the present invention as defined in the appended claims is intended to cover all such modifications and alternative constructions.

What is claimed is:

1. A fuel cap comprising:
   a threaded housing;
   a crown covering said threaded housing and having an aperture;
   a pressure relief valve carried by said threaded housing; and
   interconnecting means for selectively establishing a driving relationship between said threaded housing and said crown and for opening said pressure relief valve,
   whereby said interconnecting means is manually operable through said aperture to open said pressure relief valve and simultaneously establish a driving relationship between said threaded housing and said crown in a cap-removal direction, enhancing the safety of said cap.

2. The cap of claim 1 wherein said interconnecting means includes a driver reciprocable within said aperture between upper and lower positions such that when said driver is in said upper position said interconnecting means established a driving relationship between said threaded housing and said crown in a cap-installation direction and said crown is freely rotatable relative to said housing in a cap-removal direction, and when said driver is depressed to said lower position, said interconnecting means opens said pressure relief valve and establishes a driving relationship between said crown and said threaded housing in a cap-removal direction.

3. A cap for closing a threaded filler neck of a fuel tank, comprising:
   a threaded housing which rotatably engages said filler neck;
   a means for establishing a seal between said cap and said filler neck;
   a pressure relief valve carried by said threaded housing;
   a manually rotatable crown covering said threaded housing and having an aperture;
   a driver reciprocable axially within said aperture between upper and lower positions and rotatably coupled to said crown;
   actuator means connected to said driver for opening said pressure relief valve, said actuator means reciprocating axially with said driver between first and second positions; and
   a ratchet ring operatively connected to said driver and said actuator establishing a driving connection between said threaded housing and said crown;
   whereby, when said driver is in said upper position, said actuator means is in said first position and said pressure relief valve is closed, said crown is freely rotatable relative to said housing in a cap-removal direction, and said ratchet ring rotatably establishes a driving connection between said housing and said crown in a cap-installation direction, and
   when said driver is manually depressed to said lower position, said actuator means is moved to said second position to open said pressure relief valve and said ratchet ring rotatably establishes a driving connection between said housing and said crown in a cap removal direction, enhancing the safety of said cap.

4. The cap as claimed in claim 3, further comprising slide means for moving said driver from said lower position to said upper position upon rotation of said crown in a cap-installation direction.

5. The cap as claimed in claim 4 further comprising retainer means for retaining said actuator in said second position and said driver in said lower position when said driver is manually depressed to said lower position.

6. The cap as claimed in claim 5 wherein said actuator means includes a stem having an enlarged portion and a tip, and wherein said retainer means comprises an actuator retainer having a plurality of wings, said wings engaging said enlarged portion of said stem such that said tip opens said pressure relief valve when said driver is manually depressed to said lower position.

7. The cap as claimed in claim 6 wherein said actuator means further comprises:
   an actuator housing including means for connecting said housing to said driver; and
   second ramp means projecting from said actuator housing for translating rotational forces applied to said actuator housing to said ratchet ring.

8. The cap as claimed in claim 7 wherein said second ramp means comprises at least one actuator ramp radially outwardly projecting from said actuator housing having a camming surface, and wherein said ratchet ring includes at least one first ratchet arm having a camming surface,
   whereby said camming surface of said actuator ramp makes camming engagement with said camming surface of said first ratchet arm of said ratchet ring upon rotation of said crown in a cap-installation direction.

9. The cap as claimed in claim 8 further comprising biasing means for yieldably assisting said actuator means to move from said second position to said first position when said crown is rotated in a cap-installation direction, such that said camming surface of said actuator ramp and said first ratchet arm engage when said crown is rotated in a cap-installation direction and said actuator means is in said first position.

10. The cap as claimed in claim 9 wherein said ratchet ring includes a plurality of second ratchet arms each having a camming surface, said threaded housing having a plurality of complementary ramps projecting from said threaded housing which makes camming engagement with said camming surface on said second ratchet arms, permitting a driving relationship to exist between said ratchet ring on said threaded housing.

11. The cap as claimed in claim 10 wherein said second ratchet arms include a sliding surface, and wherein said complementary ramps have a sliding surface, said sliding surface of said second ratchet arms driving said threaded housing in a cap-installation direction when normal rotational forces are applied to said crown, said sliding surface of said second ratchet arms sliding over said sliding surface of said complementary ramps when excessive rotational forces are applied to said crown in a cap-installation direction, enhancing the safety of said cap.

12. The cap as claimed in claim 3 wherein the driver includes a radially outwardly extending shelf having projecting therefrom first ramp means for establishing a driving connection between said driver and said ratchet ring.

13. The cap as claimed in claim 12 wherein said first ramp means comprises at least one circumferentially spaced ramp downwardly projecting from said shelf which makes a driving connection with said ratchet ring when said crown is rotated in a cap-removal direction.

14. The cap as claimed in claim 13 wherein said circumferentially spaced ramp makes a driving connection with said ratchet ring by cammingly engaging said slide means.

15. The cap as claimed in claim 14 wherein said slide means includes at least one ramp which slidably engages said circumferentially spaced ramp thereby moving said driver from said lower position to said upper position when said crown is rotated in a cap-installation direction.

16. The cap as claimed in claim 15 wherein said circumferentially spaced ramp includes a camming surface, and said ramp on said slide means includes a camming surface for cammingly engaging said camming surface of said circumferentially spaced ramp, whereby rotational forces are translated from said driver to said ratchet ring when said crown is rotated in a cap-removal direction.

17. The cap as claimed in claim 3 wherein said actuator means and said driver are a single piece.

18. The cap as claimed in claim 1 or claim 3 wherein said threaded housing includes a shelf region and a threaded region, the thickness of said shelf region being thinner than the thickness of said threaded region.

* * * * *